United States Patent [19]
Schiffler

[11] Patent Number: 5,700,027
[45] Date of Patent: Dec. 23, 1997

[54] ROTARY ACTUATOR

[75] Inventor: Stefan Schiffler, Schonungen, Germany

[73] Assignee: Fichtel & Sachs AG, Schweinfurt, Germany

[21] Appl. No.: 562,476

[22] Filed: Nov. 24, 1995

[30] Foreign Application Priority Data

Nov. 26, 1994 [DE] Germany ............... 44 42 223.7

[51] Int. Cl.⁶ .................................. B60G 11/26
[52] U.S. Cl. ................................ 280/723; 280/665
[58] Field of Search .................... 280/723, 665, 280/726, 721, 772, 689; 267/273, 277

[56] References Cited

U.S. PATENT DOCUMENTS

| | | | |
|---|---|---|---|
| 3,197,233 | 7/1965 | Van Winsen et al. | 280/723 X |
| 3,392,635 | 7/1968 | Sperl et al. | 92/85 R |
| 4,884,790 | 12/1989 | Castrilli | 267/154 |
| 5,573,265 | 11/1996 | Pradel et al. | 280/689 |
| 5,575,502 | 11/1996 | Oppitz et al. | 280/689 |
| 5,577,761 | 11/1996 | Tabata | 280/723 X |

FOREIGN PATENT DOCUMENTS

| | | | |
|---|---|---|---|
| 0428439 | 5/1991 | European Pat. Off. | 280/723 |
| 1105290 | 4/1961 | Germany . | |
| 1179124 | 10/1964 | Germany . | |
| 2053649 | 5/1972 | Germany | 280/723 |
| 4229025 | 3/1994 | Germany . | |
| 4435692 | 5/1995 | Germany . | |
| 0639611 | 5/1962 | Italy | 280/723 |
| 0927745 | 6/1963 | United Kingdom . | |

*Primary Examiner*—Christopher P. Ellis
*Attorney, Agent, or Firm*—Nils H. Ljungman and Associates

[57] ABSTRACT

Rotary actuator for a divided stabilizer on a motor vehicle axle, comprising a cylinder which is closed on the ends by two caps and forms a work chamber, ribs which run axially on the inside diameter of the cylinder, a motor shaft with splines which have the same axial length as the ribs of the cylinder, whereby the splines of the motor shaft and the ribs of the cylinder divide the work chamber into individual work chambers, a first and a second hydraulic connection for two separate work chambers, a connection system between the work chambers which hydraulically connects the work chambers at least in pairs, whereby the connected work chambers are arranged so that the work chambers corresponding to the first hydraulic connection alternate with those which are connected to the second hydraulic connection, and connection surfaces on the cylinder and on the motor shaft for the stabilizer parts, whereby the motor shaft has a blind hole with a profile to locate one of the stabilizer parts.

17 Claims, 7 Drawing Sheets

ROTARY ACTUATOR

BACKGROUND OF THE INVENTION

1. Field of the Invention

The present invention generally relates to a rotary actuator for a divided stabilizer on a motor vehicle axle. The rotary actuator includes a cylinder, which cylinder is closed on the ends by two caps. The cylinder forms a work chamber and there are ribs extending axially on the inside diameter of the cylinder. The rotary actuator also includes a motor shaft with splines, which splines have the same axial length as the ribs of the cylinder, whereby the splines of the motor shaft and the ribs of the cylinder divide the work chamber into individual work chambers. The rotary actuator has a first and a second hydraulic connection for the two separate work chambers. There is a connection system between the work chambers, which connection system hydraulically connects the work chambers at least in pairs. The connected work chambers are thereby arranged so that the work chambers corresponding to the first hydraulic connection alternate with the work chambers connected to the second hydraulic connection. In addition, there are connection surfaces on the cylinder and the motor shaft for connecting with the stabilizer parts.

2. Background Information

A similar rotary actuator is described in German Laid Open Patent Application No. 42 29 025, for example. One of the problems not yet solved with this conventional rotary actuator involves the connection of the rotary actuator to the stabilizer parts. The connection flanges of the known device, as illustrated in FIG. 1 of the related application, occupy too much axial space. The connection flanges are also complex, expensive and difficult to manufacture. The connection flanges do, however, perform an important function, in that the flange clearly defines the axial position of the rotary actuator between the stabilizer parts. No axial drift or excursion of the stabilizer parts can occur.

The connection system represents an additional problem. There are no disadvantages regarding its function, however, this part of the construction also takes up too much space. The solution illustrated in FIG. 3 of German Laid Open Patent Application No. 42 29 025 with the small soldered-on tubes can only be efficiently used for custom-manufactured systems or for small manufacturing runs, because the ends of the small tubes must be fitted very exactly to the surface of the motor shaft. That is because under some conditions, the ends can come into contact with the seals in the ribs of the cylinder of the rotary actuator.

OBJECT OF THE INVENTION

The object of the present invention is to eliminate the problems of known related devices, and also to create a rotary actuator which has functional advantages.

SUMMARY OF THE INVENTION

The present invention teaches that this object can be accomplished by designing the motor shaft to include a blind hole, which blind hole can have a profile to thereby locate one of the stabilizer parts.

One essential advantage of this rotary actuator can be that the space available for the connection to the parts of the rotary actuator can be efficiently utilized. Moreover, the greatest moment of resistance can be available at essentially the point where the greatest bending moment can be exerted on the motor shaft.

Moreover, the connection system between the work chambers can be realized in the bottom of the blind hole. Compared to the conventional system as described above, not only can it be possible to save a significant amount of space, but, due to the elimination of the seals, a significant cost advantage can also be achieved. The connection system can thereby include transverse connection openings. The transverse connection openings can end in a diametral area of the motor shaft. The end in the diametral area of the motor shaft can have a smaller diameter than the rest of the diametral area. On one hand, as a result of this special diametral area, the installation of the seal into the ribs of the cylinder can be facilitated, because the ribs in the vicinity of the motor shaft with the smaller diameter can thereby be rotated. On the other hand, as a result of this special diametral area, it can become possible to reliably prevent the seal in the ribs from closing or blocking the ends of the transverse holes or openings.

According to an additional measure to optimize the transmission or force or torque to the rotary actuator, the matching profile of the stabilizer, when the rotary actuator has been installed, can be engaged in an area of the profile of the motor shaft, which area of the profile of the motor shaft can overlap the length of the splines of the motor shaft. The area of the motor shaft which can be relatively weak or thin, due to the seat of the roller bearings, essentially need only transmit the bending moments.

One requirement for a rotary actuator is that the location of the installation of the rotary actuator should be unambiguously defined. It should be essentially absolutely guaranteed that the rotary actuator is not installed with the sides transposed. One advantageous feature of the present inventions that the bottom of the blind hole can be located outside the middle of the longitudinal axis in relation to the entire rotary actuator. During installation, it could thus be immediately apparent if the motor were not being installed in the correct position. One additional approach to the solution of this problem is that the longitudinal areas of the matching profiles of the stabilizer parts can be placed at different distances from their respective closest end surfaces. The effect achieved can be their respective closest end surfaces. The effect achieved can be that, as with a key, the profiles can only be brought into engagement in one single installation position. Otherwise it could be easy to rotate the rotary actuator by hand on the stabilizer, because the profile connections would not be properly engaged.

With regard to the problem of defining the position of the rotary actuator in the axial direction, the bottom can represent an axial stop for at least one of the stabilizer parts.

During the manufacture of the rotary actuator, in particular of the profile in the motor shaft, dirt can be formed and this dirt should be reliably removed. A solid bottom in the motor shaft would make flushing difficult, however, the bottom can have at least one passage opening, which passage opening can extend essentially axially and can thereby connect the two sides of the bottom.

It should be understood that when the work "invention" is used in this application, the word "invention" includes "inventions," that is, the plural of "invention." By stating "invention," Applicant does not in any way admit that the present application does not include more that one patentably and non-obviously distinct invention, and maintains the possibility that this application may include more than one patentably and non-obviously distinct invention. The Applicant hereby asserts that the disclosure of this application may include more that one invention, and, in the event that there is more than one invention, that these inventions may be patentable and non-obvious, one with respect to the other.

One aspect of the present invention resides broadly in a vehicular suspension system comprising a hydraulic rotary actuator; the hydraulic rotary actuator comprising a body; the body of the hydraulic rotary actuatory comprising a first member and a second member; at least one of the first member and the second member being rotatable with respect to the other of the first member and the second member; the at least one of the first member and the second member being rotatable about an axis of rotation with respect to the other of the first member and the second member by hydraulic fluid under pressure; a first stabilizer bar; a second stabilizer bar; a first hole and a second hole being disposed substantially within the body; the first hole comprising means for preventing insertion of the first stabilizer bar into the body beyond a first distance; and the second hole comprising means for preventing insertion of the second stabilizer bar into the body beyond a second distance.

Another aspect of the present invention resides broadly in a hydraulic rotary actuator for use such as in a vehicular suspension system, the hydraulic rotary actuator comprising a body; the body of the hydraulic rotary actuator comprising a first member and a second member; at least one of the first member and the second member being rotatable with respect to the other of the first ember and the second member; the at least one of the first member and the second member being rotatable about an axis of rotation with respect to the other of the first member and the second member by hydraulic fluid under pressure; a first stabilizer bar; a second stabilizer bar; a first hole and a second hole being disposed substantially within the body; the first hole comprising means for preventing insertion of the first stabilizer bar into the body beyond a first distance; and the second hold comprising means for preventing insertion of the second stabilizer bar into the body beyond a second distance.

Yet another aspect of the present invention resides broadly in a hydraulic rotary actuator comprising a body; the body of the hydraulic rotary actuator comprising a first member and a second member; at least one of the first member and the second member being rotatable with respect to the other of the first member and the second member; the at least one of the first member and the second member being rotatable about an axis of rotation with respect to the other of the first member and the second member by hydraulic fluid under pressure; a first stabilizer bar; a second stabilizer bar; a first hole and a second hole being disposed substantially within the body; the first hole comprising means for preventing insertion of the first stabilizer bar into the body beyond a first distance; and the second hole comprising means for preventing insertion of the second stabilizer bar into the body beyond a second distance.

BRIEF DESCRIPTION OF THE DRAWINGS

The present invention is explained below in greater detail with reference to the accompanying drawings, in which.

DESCRIPTION OF THE PREFERRED EMBODIMENT

Figure 1:
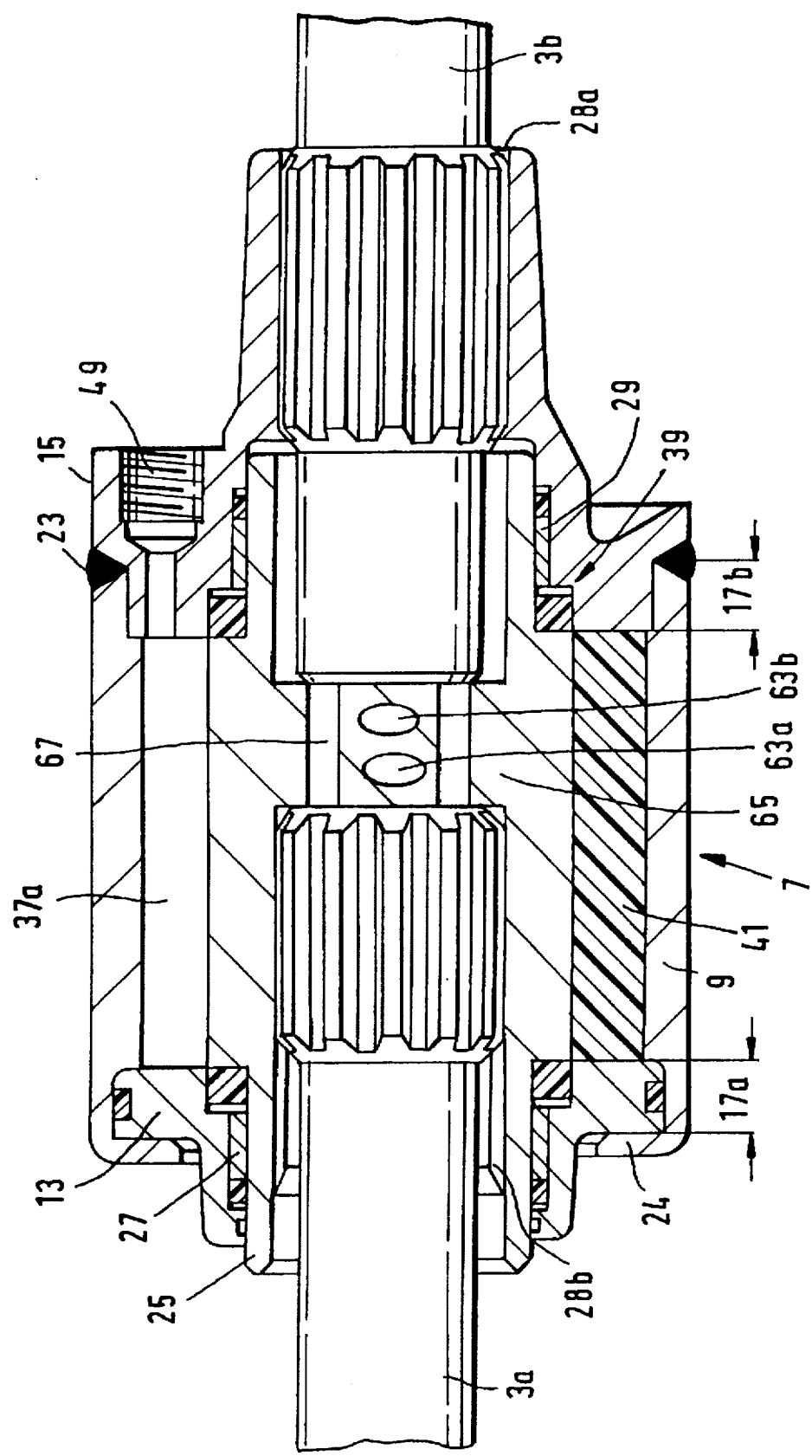
FIG. 1 shows a rotary actuator with a stabilizer in longitudinal section.

FIG. 1 shows a detail of a stabilizer with stabilizer parts 3a and 3b and a rotary actuator 7. In FIG. 1, the rotary actuator 7 is shown as it could be used, for example, on an adjustable stabilizer to control the roll of a motor vehicle. The following description can also be considered to apply to FIG. 2.

The rotary actuator 7 can include, in part, a cylinder 9. On the inside diameter of the cylinder 9 there can be ribs 11, which ribs 11 can extend in the axial direction. The ribs 11 and the cylinder 9 can preferably be realized as one piece. On the two ends of the cylinder 9, a cap or cover 13 and a cap or cover 15 can define a work chamber. The caps 13 and 15 can have an overlap 17a and 17b, respectively, with the cylinder 9. The position of the caps 13 and 15 inside the cylinder 9 can be defined by the end surfaces of the ribs 11. The cap or cover 15 can be connected to the cylinder 9 by means of a weld seam 23. The overlap 17b can thereby be kept as short as possible, to keep the theoretical lever arm as small as possible for a radially-exerted compression force in the work chamber. This radially-exerted compression force in the work chamber together with the pressure force on the weld seam 23 can exert a bending moment.

The cap or cover 13 can be fixed inside the rotary actuator 7 by means of a rolled or crimped collar 24. Instead of the rolled or crimped collar 24, the deformation connection can alternatively also be formed by at least one partial bead. Closing surfaces can thereby be formed, which closing surfaces can be connected to the rest of the rolled or crimped collar 24 by means of transitions. The manufacture of such a deformation can be relatively simple, and can require essentially only a stamping tool, which stamping tool can be pressed into the rolled or crimped collar 24 from radially outside to radially inside, whereby the width of the stamping tools can determine the width of the sealing surfaces.

Inside the work chamber there can be a motor shaft 25, which motor shaft 25 can have a connection 28b. The connection 28b can preferably be in the form of an internal profile, so that a component to be rotated can be connected to the rotary actuator 7. The motor shaft 25 can be rotationally mounted by means of friction bearings 27 and 29. The outside diameter of the motor shaft 25 can include a number of splines 31, which splines 31 can preferably have essentially the same axial orientation as the ribs 11 of the cylinder 9.

In summary, in accordance with one embodiment of the present invention, the rotary actuator 7, as shown in FIG. 1, can be used for the reduction of the rolling motion of motor vehicles. The cylinder 9 can have internal walls, which internal walls can include the ribs 11. The ribs 11 can preferably be integral with the cylinder 9. The ribs 11 can include arcuate surfaces to act in cooperation with the splines 31 of the motor shaft 25. The cap 13 can overlap one axial end of the cylinder 9 and the cap 15 can overlap the other axial end of the cylinder 9. The cap 13 together with the cap 15 can thereby define a chamber therebetween. By means of the weld seam 23, the cap 15 can be connected to the cylinder 9 such that the overlap 17b can be kept relatively short to thereby permit the bending movement. For the purpose of connecting the cap 13 to the other axial end of the cylinder 9, the end of the cylinder 9 can be deformed by stamping, for example, to thereby form the rolled or crimped collar 24. Alternatively, the cap 13 can be connected to the end of the cylinder 9 by means of a partial bead. The partial bead or the rolled or crimped collar 24 can thereby form a closing or sealing surface for the cap 13 and the cylinder 9.

The ribs 11 and the inside wall surface 33 of the cylinder 9, as well as the splines 31 and the outside cylindrical surface 35 of the motor shaft 25, can together form work chambers 37a and 37b. The work chambers 37a, 37b can be sealed by axial seals 39 in the vicinity of the base of the splines 31 between the caps 13, 15 and the splines 31. The work chambers 37a and 37b can also be sealed by flat seals 41, which flat seals 41 can be located in the ribs 11 and the splines 31.

Figure 2:
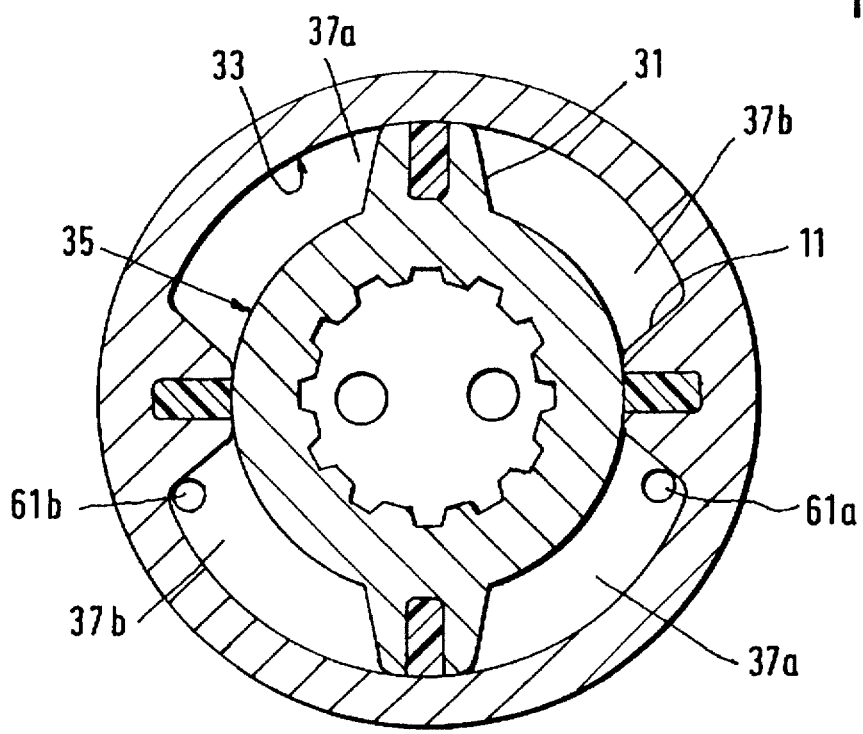
FIGS. 2 and 3 show cross sectional views of the rotary actuator.

In summary, in accordance with one embodiment of the present invention, the work chambers 37a can preferably be hydraulically separated from the work chambers 37a. As shown in FIG. 2, each of the work chambers 37a and 37b can be formed by the respective spaces formed by the splines 31, the ribs 11, the inside wall surface 33 of the cylinder 9, and the outside cylindrical surface 35 of the motor shaft 25. For the purpose of sealing each of the work chambers 37a and 37b, as shown in FIG. 1, the axial seals 39 and the flat seals 41 can be located adjacent the work chambers 37a and 37b. The axial seals 39 can preferably be located radially within the cap 13 and the cap 15. The flat seals 41 can preferably be located in the ribs 11 and in the splines 31, to permit a seal between each of the work chambers 37a and 37b.

Figure 1A:
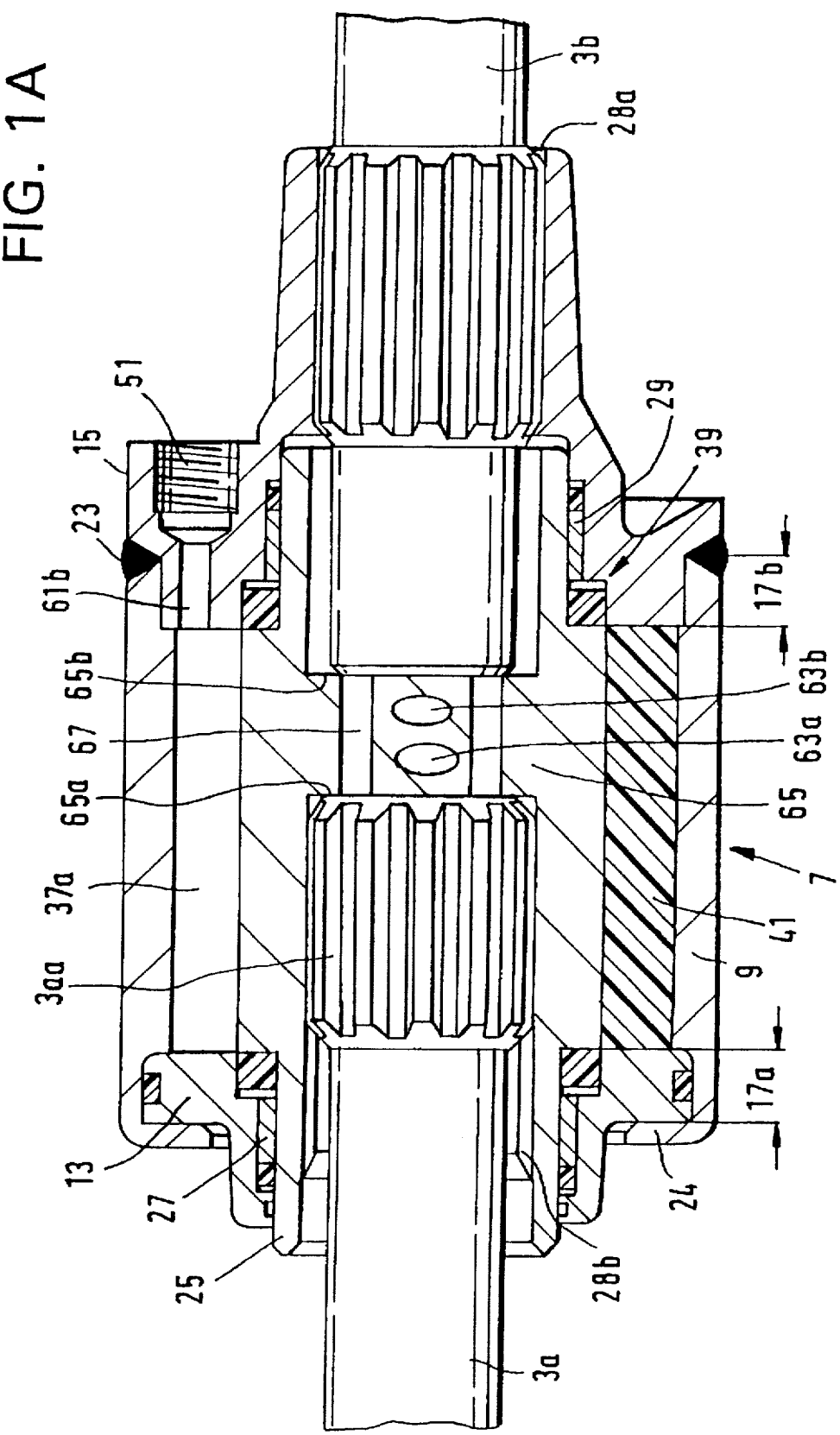
FIG. 1A shows the same view as shown in FIG. 1 only with additional components.
Figure 1B:
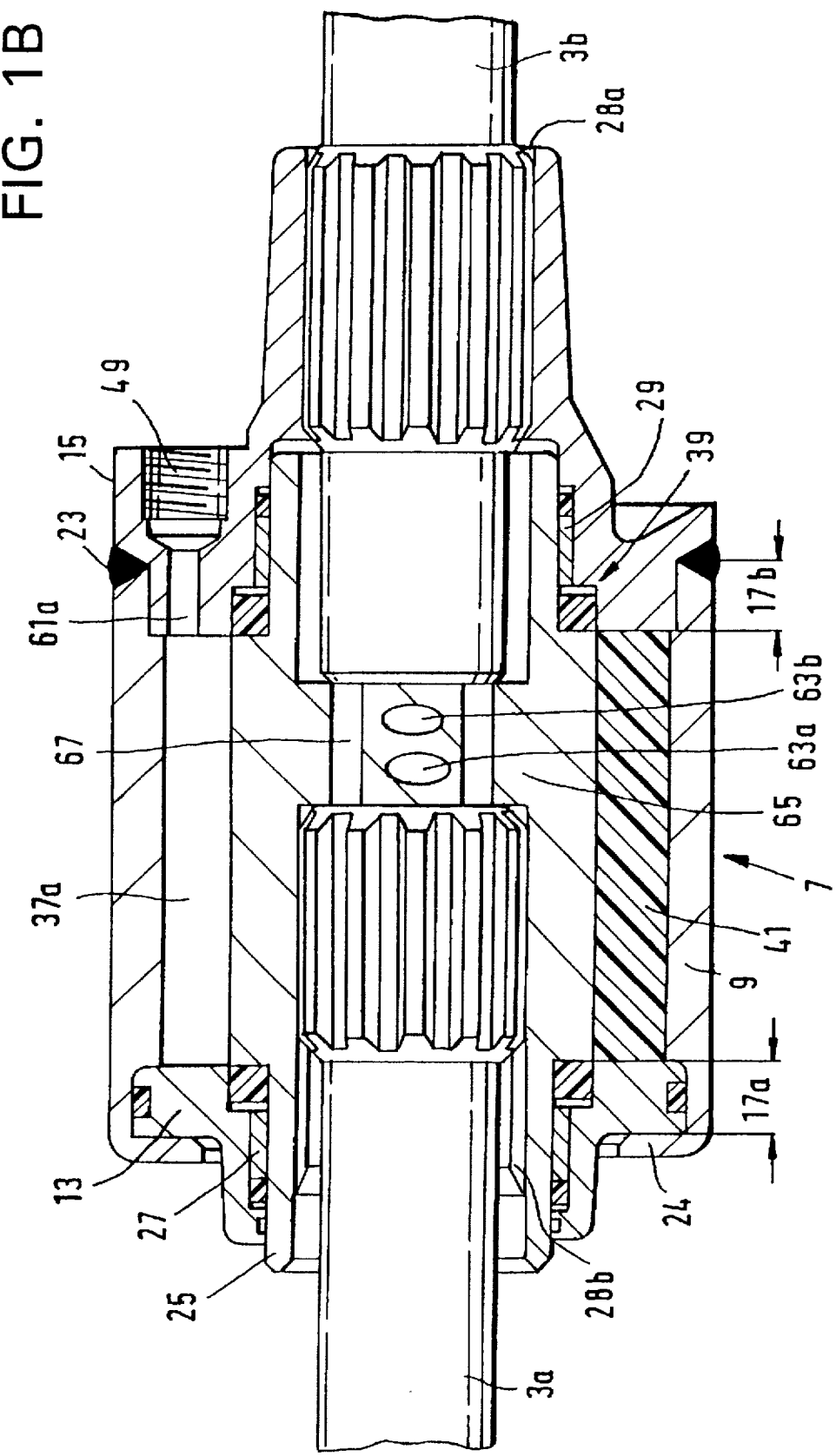
FIG. 1B shows the same view as shown in FIG. 1 only with additional components.

The cap 15 can preferably be provided with a first hydraulic connection 49 and a second hydraulic connection 51. The first hydraulic connection 49 and the second hydraulic connection 51 can be oriented parallel to the principal axis of the rotary actuator 7, although to simplify the drawing, the first hydraulic connection 49 is shown in FIG. 1 and the second hydraulic connection 51 is shown in FIG. 1A. The hydraulic connections 49 and 51 can preferably be placed in the welded cap 15, since in the cap 15, the hydraulic connections 49 and 51 can essentially always be stationary relative to a connection 28a for a neighboring component, e.g. the stabilizer part 3b. Each of the two hydraulic connections 49, 51 can be directly connected with work chambers 37a, 37b respectively.

In accordance with one embodiment of the present invention, therefore, the first hydraulic connection 49 and the second hydraulic connection 51 can each preferably be oriented parallel to the axis of the rotary actuator 7. Furthermore, the first hydraulic connection 49 and the second hydraulic connection 51 can preferably be located within the cap 15. Thus, the first and second hydraulic connection 49 and 51 can remain essentially stationary with respect to the connection 28a for the stabilizer part 3b. The first and second hydraulic connections 49 and 51 can preferably provide hydraulic pressure within the work chambers 37a and 37b, respectively. Thus, the first hydraulic connection 49 and the second hydraulic connection 51 can be essentially identical to one another. Each of the first hydraulic connection 49 and the second hydraulic connection 51 can, however, lead into a different one of the work chambers 37a and 37b, that is, the first hydraulic connection 49 can lead into work chamber 37a and the second hydraulic connection 51 can lead into the work chamber 37b.

In addition, by means of a connection system, there can be a connection between each of the work chambers 37a and 37b with the same respective reference numbers, as shown in FIG. 2, whereby the work chambers 37a connected to one another by the first hydraulic connection 49 can alternate with the work chambers 37b of the second hydraulic connection 51. The connection system can include two transverse connection openings 63a and 63b, which connection openings 63a and 63b can be made in a bottom 65 of the motor shaft 25. The transverse connection openings 63a and 63b can end in a diametral area 25a (see FIG. 3), which diametral area 25a can have a smaller diameter than the rest of the diametral area with respect to the transverse plane. On one hand, the flat seals 41 can more easily be inserted into the ribs 11, and on the other hand, there can be an effective prevention against a flat seal 41 from closing one end of the connection openings 63a and 63b. The bottom 65 can be an integral part of a blind hole of the motor shaft 25. In accordance with this embodiment, the bottom 65 can be connected in one piece to the motor shaft 25, however, force-fitted and/or welded connections can also be used.

Figure 3:
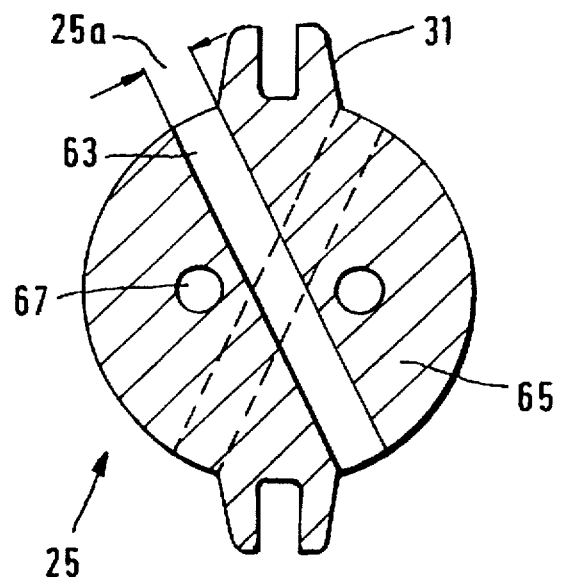
Figure 3A:
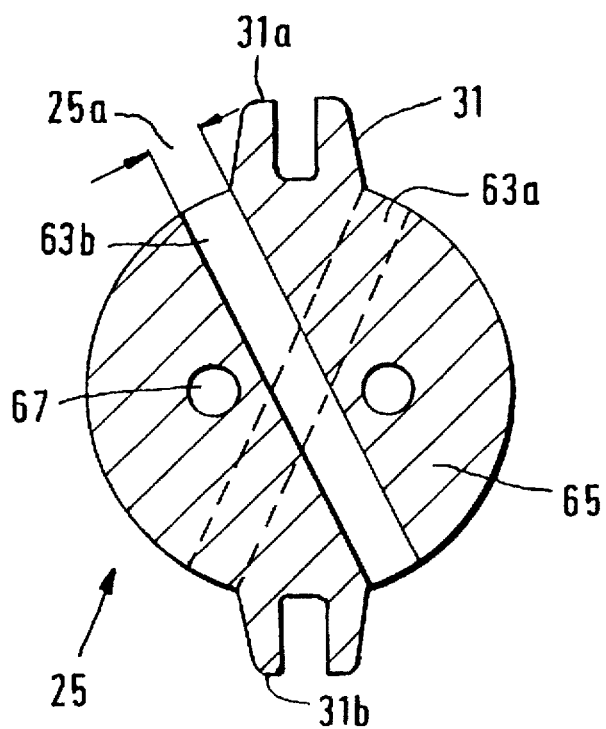
FIG. 3A shows the same view as shown in FIG. 3 only with additional components.
Figure 3B:
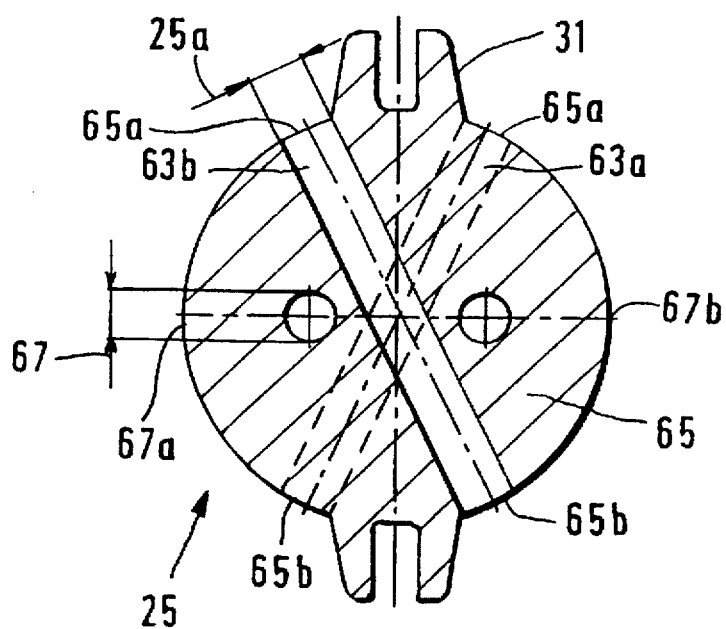
FIG. 3B shows a cross sectional view of another embodiment of the rotary actuator.

In accordance with one embodiment of the present invention, therefore, as shown in FIG. 2, the work chambers 37a can alternate with the work chambers 37b. The connection system can include the transverse connection opening 63a and the transverse connection opening 63b, as shown in FIG. 3B. With reference to FIGS. 2 and 3, the transverse opening 63b can, for example, provide a connection between each of the two work chambers 37a. Similarly, the transverse connection opening 63a can, for example, provide a connection between each of the two work chambers 37b. As shown in FIG. 3A, the diameter of the bottom 65, for example, from point 25e to point 25d, can preferably be less than the diameter of the splines 31, that is, from point 31a to point 31b. The ends of each of the transverse connection openings 63a and 63b can lead into the diametral areas 25a.

In accordance with one embodiment of the present invention, with reference to FIG. 3B, the bottom 65 of the motor shaft 25 can be designed such that the diameter between each point 65a and the respective point 65b can preferably be less that the diameter between point 67a and 67b of the bottom 65. Such a configuration of the motor shaft 25 can facilitate the installation of the flat seals 41 into the ribs 11. By essentially rotating the ribs 11 adjacent the smaller diameter of the diametral areas 25a, the flat seals 41 can be relatively easily inserted into the ribs 11. The ribs 11 can then be rotated back to the respective point 67a or 67b such that the ribs 11 can fit against the respective point 67a and 67b. During the operation of the rotary actuator 7, the cylinder 9 and the motor shaft 25 can rotate with respect to one another. When the ribs 11 are rotated adjacent the diametral areas 25a, the smaller diameter of the diametral areas 25a can prevent contact between the flat seals 41 of the ribs 11 and the ends of the transverse connection openings 63a and 63b. The flat seals 41 of the ribs 11 can thereby be prevented from blocking the flow of hydraulic fluid to the ends of the transverse connection openings 63a and 63b.

During the installation of the rotary actuator 7, the cylinder 9, having been machined as necessary, can preferably be thoroughly cleaned and, thereafter, welded in a welding jig to the cap 15, whereby the MAG process can be appropriate for economic reasons. It can thereby be possible to also use the cap 15 as a prefabricated part. After the welding, the weld seam 23 can be tested for leaks and the weld seam 23 can be repaired if necessary. Then the bearing 29 with the axial seal 39 can be installed in the cap 15. The flat seals 41 can be inserted into the ribs 11. Then the motor shaft 25 can be thoroughly cleaned, whereby passages 67 in the bottom 65, which passages 67 can extend essentially axially, can make it easier to clean the motor shaft 25 using liquid media. Then the motor shaft 25, which motor shaft 25 can also be equipped with the flat seals 41, can be introduced into the cylinder 9, until the motor shaft 25 can come into contact with the axial seal 39. In an additional process step, the cap 13, along with the bearing 27 and seal 39, can be inserted into the cylinder 9 until the cap 13 can come into contact with the end surface of the cylinder 9. Then the deformation connection can be made by rolling the collar 24 on the cap 13. When the cylinder 9 has essentially been assembled, a final cleaning can be performed to prepare the cylinder 9 for the painting process. In particular, this cleaning can also be performed with liquid media, whereby the passages 67 can be used, so that the cleaning medium can essentially be reliably and automatically discharged.

After the rotary actuator 7 has been assembled, the stabilizer parts 3a and 3b can be inserted into the interior profile of the connections 28a and 28b. The bottom 65 can represent an axial stop for the stabilizer parts 3a and 3b and can define the installed position. Because the bottom 65 can be located outside the center of the longitudinal axis in relation to the rotary actuator 7, it can be possible to essentially guarantee the correct positioning of the stabilizer parts 3a and 3b for installation.

In accordance with one embodiment shoulders 65a and 65b (see FIG. 1A) can serve as axial stops for the stabilizer parts 3a and 3b, respectively.

Figure 2A:
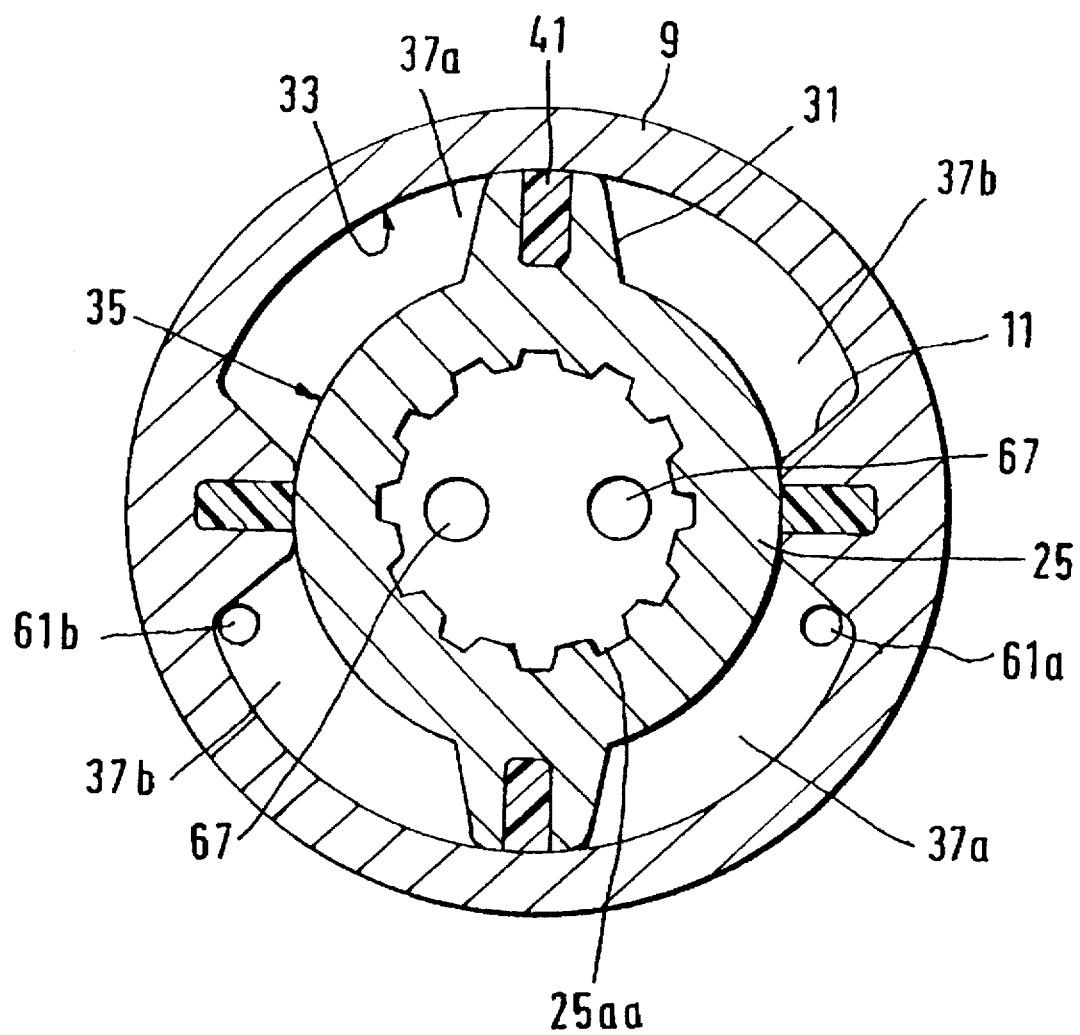
FIG. 2A shows the same view as shown in FIG. 2 only with additional components.

Alternatively, as illustrated in FIG. 1, the longitudinal sections of the matching profile of the stabilizer parts 3a and 3b can be at different distances from their respective end surfaces. The inner profiles of the teeth 3aa (see FIG. 1A) of the connections 28a and 28b can also be at different distances from the bottom 65. Consequently, for the individual profile connections 28a and 28b, there can be only one defined position in which each of the connections 28a and 28b can be installed, since otherwise the profile connections 28a and 28b would essentially not engage. In the design of the profile connection 28a and 28b, care can preferably be taken that the stabilizer 3a can be engaged in an area of the inner profile 25aa (see FIG. 2A) of the motor shaft 25, which area of the inner profile 25aa of the motor shaft 25 can preferably lie in the longitudinal range of the splines 31 of the motor shaft 25. The splines 31 can provide reinforcement of the motor shaft 25 against the torsional moments that can be experienced by the motor shaft 25. The relatively thin bearing area of the motor shaft 25 can be only required to transmit bending moments.

In accordance with one embodiment of the present invention, the blind holes or inner profiles of each of the connections 28a and 28b can be located at different distances with respect to the center of the longitudinal axis of the rotary actuator 7. As a result, it can be essentially guaranteed that the rotary actuator 7 is not installed with the sides transposed. Alternatively, to essentially guarantee the correct installation of the rotary actuator 7, the rotary actuator 7 can be designed such that the installation positions of the stabilizer parts 3a and 3b can be located at different distances from the respective splines 31 of the motor shaft 25.

The function of the rotary actuator 7 can be relatively simple. By means of one of the two hydraulic connections 49, 51, e.g. connection 49, hydraulic medium can flow at an overpressure into the rotary actuator 7. By means of one of the axial channels 61a or 61b, and from the axial channels 61a and 61b and via the connection openings 63a and 63b, the hydraulic medium can travel into the respective connected work chamber 37a and 37b. The pressure inside the connected chambers 37a supplied with high-pressure hydraulic medium can produce a relative rotational movement between the motor shaft 25 and the cylinder 9. The hydraulic medium inside the work chambers 37b not supplied with hydraulic medium can be displaced by the relative movement between the ribs 11 and the splines 31, via the axial channel 61a and 61b, into a storage tank (not shown).

Figure 4:
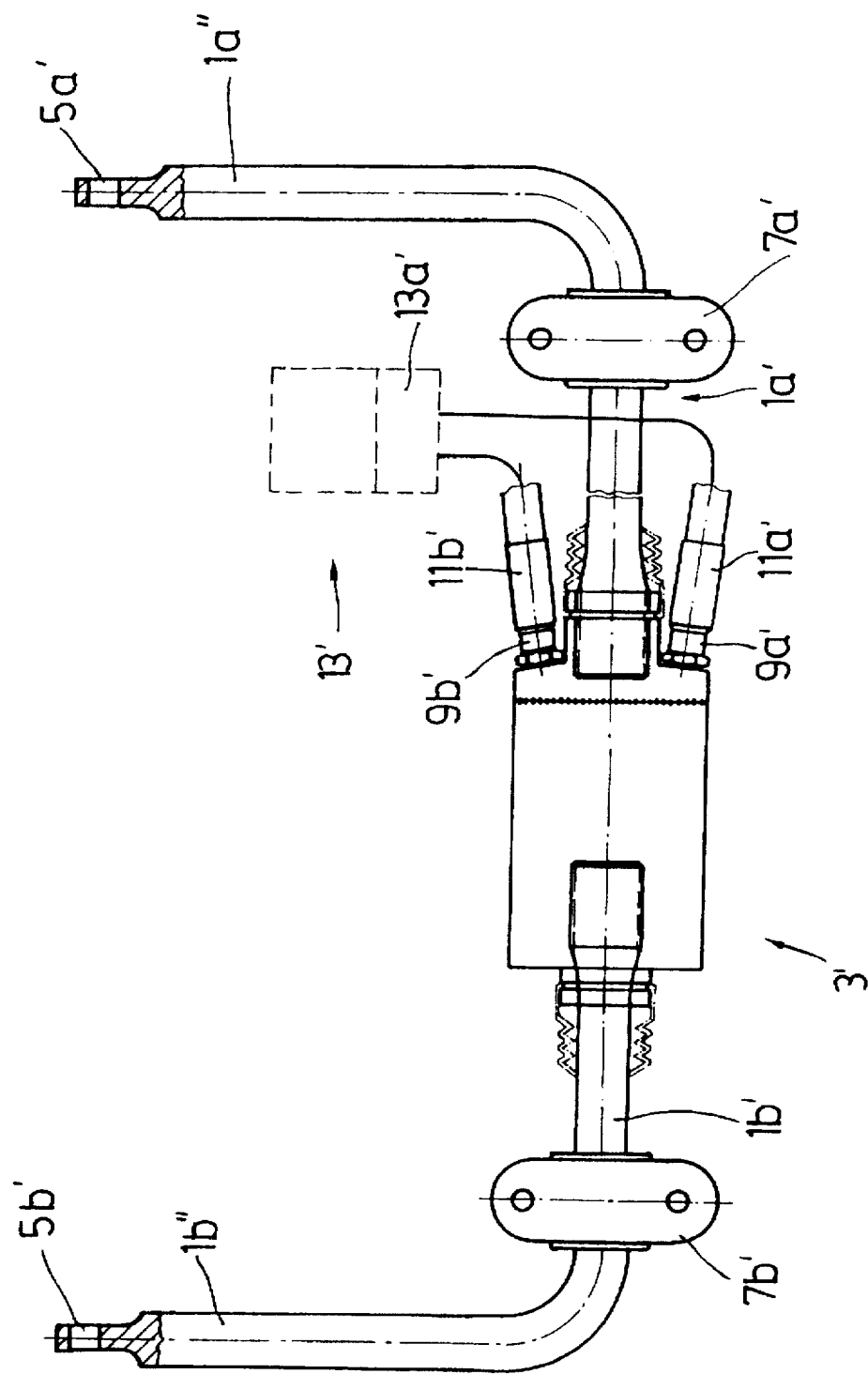
FIG. 4 schematically illustrates a complete stabilizer system.

FIG. 4 shows a more complete rotary actuator in which the present invention could be incorporated. It should be understood that the components discussed above with reference to FIGS. 1–3B can be considered to be interchangeable with similar components discussed herebelow. FIG. 4 shows a stabilizer 1a40, 1b' with a rotary actuator 3'. On the angled ends 1a", 1b" there preferably are locators 5a', 5b' in which wheel bearings of a motor vehicle (not shown in the figure, for purposes of simplicity) can be engaged by means which are generally known and therefore not discussed in any further detail herein. The stabilizer 1a', 1b' is preferably fastened to the vehicle by means of articulated clips 7a', 7b'.

The rotary actuator 3' can preferably have a rotary actuator housing 3a'. The rotary actuator housing 3a' can preferably be non-rotationally connected to the stabilizer part 1a', and rotary actuator vane assembly can preferably be non-rotationally connected to the stabilizer part 1b'. In the event of uneven deflection of the vehicle springs, the rotary actuator 3' can be rotated by means of the angled ends 1a", 1b", whereby wheel contact forces can interact with the angled ends 1a", 1b" to exert a torsional moment on the stabilizer 1a', 1b'.

The rotary actuator 3' preferably has two hydraulic connections 9a', 9b' which form a connection to a hydraulic system 13' via the hydraulic lines 11a', 11b'. The hydraulic system 13' preferably includes at least a hydraulic valve 13a'. The hydraulic system 13' and hydraulic valve 13a' are generally considered to be well known and are, therefore, not discussed in any further detail herein. The components of the hydraulic system 13' can be permanently installed in the vehicle so that with each deflection of the vehicle springs or stabilizer 1a', 1b' movement, there can be a relative movement of the hydraulic lines 11a', 11b' with respect to the hydraulic system 13'. This movement preferably must be compensated for by the hydraulic hoses forming the hydraulic lines 11a', 11b' together with the hydraulic connections 9a', 9b'.

One feature of the invention resides broadly in the rotary actuator for a divided stabilizer on a motor vehicle axle, comprising a cylinder which is closed on the ends by two caps and forms a work chamber, ribs which run axially on the inside diameter of the cylinder, a motor shaft with fins which have the same axial length as the rigs of the cylinder, whereby the blades of the motor shaft and the ribs of the cylinder divide the work chamber into individual work chambers, a first and a second hydraulic connection for two separate work chambers, a connection system between the work chambers which hydraulically connects the work chambers at least in pairs, whereby the connected work chambers are arranged sot hat the work chambers corresponding to the first hydraulic connection alternate with those which are connected to the second hydraulic connection, and connection surfaces on the cylinder and the motor shaft for the stabilizer parts, characterized by the fact that the motor shaft 25 has a blind hole with a profile to locate one of the stabilizer parts 3a; b.

Another feature of the invention resides broadly in the rotary actuator characterized by the fact that the connection system between the work chambers 37a; b is realized in the bottom 65 of the blind hole.

Yet another feature of the invention resides broadly in the rotary actuator characterized by the fact that the connection system consists of transverse connection openings 63a; b.

Still another feature of the invention resides broadly in the rotary actuator characterized by the fact that the transverse connection openings 63a; b end in a diameter area 25a of the motor shaft 25 which has a smaller diameter that the rest of the diameter area.

A further feature of the invention resides broadly in the rotary actuator characterized by the fact that the matching profile of the installed stabilizer 3a; b is engaged in an area of the profile of the motor shaft 25 which overlaps with the length of the blades 31 of the motor shaft 25.

Another feature of the invention resides broadly in the rotary actuator characterized by the fact that the bottom 65 of the blind hole is located outside the center of the longitudinal axis, in relation to the overall rotary actuator.

Yet another feature of the invention resides broadly in the rotary actuator characterized by the fact that the longitudinal portions of the matching profiles of the stabilizer parts 3a; b are at different distances from their respective closest end surfaces.

Still another feature of the invention resides broadly in the rotary actuator characterized by the fact that the bottom 65 represents an axial stop for at least one of the stabilizer parts.

A further feature of the invention resides broadly in the rotary actuator characterized by the fact that the bottom 65 has at least one passage opening 67 which runs essentially axially and connects the two sides of the bottom.

The components disclosed in the various publications, disclosed or incorporated by reference herein, may be used in the embodiments of the present invention, as well as, equivalents thereof.

Some types of automobile suspension systems that could be utilized in accordance with the rotary actuator motor may be or are disclosed by the following U.S. Pat. Nos.: 5,178,406 to Reynolds, entitled "Torsion Bar Suspension"; 5,286,059 to Tabe, entitled "Height Control System when Vehicle Is Jacked Up"; 5,288,101 to Minnett, entitled "Variable Rate Torsion Control System for Vehicle Suspension"; and 5,290,048 to Takahashi and Yamashita, entitled "Working Fluid Circuit for Active Suspension Control System of Vehicle".

Some types of rotary actuators that could be utilized in accordance with the present invention may be or are disclosed by the following U.S. Pat. Nos. 5,332,236 to Kastuhara et al., entitled "Sealing Mechanism for a Rotary Actuator"; 5,309,816 to Weyer, entitled "Rotary Actuator with External Bearings"; 5,267,504 to Weyer, entitled "Rotary Actuator with Annular Fluid Coupling Rotatably Mounted to Shaft"; and 5,310,021 to Hightower, entitled "Motor-driven, Spring-returned Rotary Actuator".

Some types of seals that could be utilized with the present invention may be or are disclosed by the following U.S. Pat. Nos.: 5,321,964 to Lovell et al., entitled "External Seal Device for Tube Hydroforming"; 5,250,607 to Comert et al., entitled "Moisture Cured Elastomeric Interpenetrating Network Sealants"; 5,259,737 to Kamisuki et al., entitled "Micropump with Valve Structure"; 5,234,194 to Smith, entitled "Seal for a Shaft"; and 5,190,299 to Johnston, entitled "Radially Undulating Shaft Seal".

Some type of industrial robots and assembly processes using such robots which could possibly be utilized for assembling rotary actuators might be or are disclosed by the following U.S. Pat. Nos.: 5,197,846 to Uno et al., entitled "Six-Degree-of-Freedom Articulated Robot Mechanism and Assembling and Working Apparatus Using Same"; 5,203,073 to Kotake et al., entitled "Apparatus for Assembling Exterior Parts of a Motorcar"; 5,267,385 to Ikeda et al., entitled "Automatic Assembly Apparatus"; 5,295,778 to Hirai et al., entitled "Assembling Apparatus"; and 5,319,845 to Watanabe, et al., entitled "Assembling Apparatus Using Robot".

Some examples of rotary actuators which could be utilized in accordance with the embodiments of the present invention may be found in the following Federal Republic of Germany Patents or Patent Applications: No. DE 42 29 025 A1 and No. P 43 37 821.8.

Some types of MAG processes which could be utilized for assembly in accordance with the present invention may be found in the following U.S. Pat. Nos.: 4,956,541 entitled "Current Nozzle for MIG- and MAG-welding Burner" and No. 4,999,474 entitled "Gas Mixture and Welding Method".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 42 223.7, filed on Nov. 26, 1994, having inventor Stefan Schiffler, and DE-OS P 44 42 223.7 and DE-PS P 44 42 223.7, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A vehicular suspension system comprising:
   a hydraulic rotary actuator;
   said hydraulic rotary actuator comprising a body;
   said body of said hydraulic rotary actuator comprising a first member and a second member;
   at least one of said first member and said second member being rotatable with respect to the other of said first member and said second member;
   said at least one of said first member and said second member being rotatable about an axis of rotation with respect to the other of said first member and said second member by hydraulic fluid under pressure;
   a first stabilizer bar;
   a second stabilizer bar;

a first hole and a second hole being disposed substantially within said body;

said first hole comprising means for preventing insertion of said first stabilizer bar into said body beyond a first distance;

said second hole comprising means for preventing insertion of said second stabilizer bar into said body beyond a second distance;

each said means for preventing insertion comprising a substantially continuous bottom in its corresponding hole;

each said first hole and said second hole having a first end and a second end;

each said first end comprising an opening; and each said second end comprising said substantially continuous bottom disposed opposite said opening of said corresponding first end.

2. The vehicular suspension system according to claim 1, wherein:

said first hole comprises means for non-rotatably engaging said first stabilizer bar; and said second hole comprises means for non-rotatably engaging said second stabilizer bar.

3. The vehicular suspension system according to claim 2, wherein:

said means for non-rotatably engaging said first stabilizer bar of said first hole comprises means for solely receiving said first stabilizer bar; and said means for non-rotatably engaging said second stabilizer bar of said second hole comprising means for solely receiving said second stabilizer bar.

4. The vehicular suspension system according to claim 3, wherein:

a portion of said body of said hydraulic rotary actuator is disposed between said substantially continuous bottom of said first hole and said substantially continuous bottom of said second hole;

said portion of said body of said hydraulic rotary actuator comprising a solid, continuous portion of said body of said hydraulic rotary actuator;

said first member of said hydraulic rotary actuator comprises shaft means;

said second member of said hydraulic rotary actuator comprises cylinder means;

said cylinder means and said shaft means being disposed to rotate about said axis of rotation;

said shaft means being disposed concentrically within said cylinder means;

said cylinder means being disposed to rotate concentrically about said shaft means;

a plurality of work chambers being disposed substantially between said cylinder means and said shaft means;

said plurality of work chambers being concentrically spaced apart from one another;

said plurality of work chambers comprising at least a first chamber, a second chamber, a third chamber, and a fourth chamber;

said first chamber and said third chamber being disposed opposite one another;

said second chamber and said fourth chamber being disposed opposite one another; and each of said first chamber and said third chamber being disposed to alternate with each of said second chamber and said fourth chamber.

5. The vehicular suspension system according to claim 4, wherein:

said portion of said body of said hydraulic rotary actuator comprises first means for providing a hydraulic connection between said first chamber and said third chamber;

said portion of said body of said hydraulic rotary actuator comprising second means for providing a hydraulic connection between said second chamber and said fourth chamber;

said first means for providing a hydraulic connection comprising a first transverse opening being disposed in said portion of said body;

said first transverse opening being disposed substantially between said first chamber and said third chamber;

said first transverse opening comprising means for providing hydraulic communication between said first chamber and said third chamber;

said second means for providing a hydraulic connection comprising a second transverse opening being disposed in said portion of said body;

said second transverse opening being disposed substantially between said second chamber and said fourth chamber;

said second transverse opening comprising means for providing hydraulic communication between said second chamber and said fourth chamber;

said portion of said body of said hydraulic rotary actuator having an outer circumference;

a substantial portion of said portion of said body comprising a first portion of said portion of said body;

said first portion having a diameter;

said first transverse opening comprising a second portion of said portion of said body;

said second portion having a length;

said second transverse opening comprising a third portion of said portion of said body;

said third portion having a length;

said length of said second portion and said length of said third portion being substantially equal; and said length of each of said second portion and said third portion being less than said diameter of said first portion.

6. The vehicular suspension system according to claim 5, wherein:

said axis of rotation defines a longitudinal axis and an axial direction parallel to said longitudinal axis;

said first stabilizer bar having a first end disposed adjacent said hydraulic rotary actuator;

a first plurality of external teeth disposed concentrically about a portion of said first end of said first stabilizer bar;

said first plurality of external teeth projecting radially outward;

said first plurality of external teeth having a length disposed parallel to said axial direction;

said means for non-rotatably engaging said first stabilizer bar comprising means for engaging said first plurality of external teeth;

said shaft means having a first inner circumferential portion;

said means for engaging said first plurality of external teeth comprising a first plurality of internal teeth disposed within said first inner circumferential portion of said shaft means;

said first plurality of internal teeth projecting radially inward;

said first plurality of internal teeth having a length disposed parallel to said axial direction;

said first plurality of external teeth of said first stabilizer bar being engaged within said said first plurality of internal teeth of said first inner circumferential portion of said shaft means;

said second stabilizer bar having a first end disposed adjacent said hydraulic rotary actuator;

a second plurality of external teeth disposed concentrically about a portion of said first end of said second stabilizer bar;

said second plurality of external teeth projecting radially outward;

said second plurality of external teeth having a length disposed parallel to said axial direction;

said means for non-rotatably engaging said seconds stabilizer bar comprising means for engaging said second plurality of external teeth;

said shaft means having a second inner circumferential portion;

said means for engaging said second plurality of external teeth comprising a second plurality of internal teeth disposed within said second inner circumferential portion of said shaft means;

said second plurality of internal teeth projecting radially inward;

said second plurality of internal teeth having a length disposed parallel to said axial direction; and said second plurality of external teeth of said second stabilizer bar being engaged within said second plurality of internal teeth of said second inner circumferential portion of said shaft means.

7. The vehicular suspension system according to claim 6, wherein:

said hydraulic rotary actuator having a first end and a second end and said longitudinal axis disposed therebetween;

a central portion of said hydraulic rotary actuator being disposed between said first end and said second end;

said portion of said body of said hydraulic rotary actuator being disposed between at least one of:
said first end and said central portion of said hydraulic rotary actuator; and
said second end and said central portion of said hydraulic rotary actuator;

said portion of said body having a first side and a second side;

said first side of said portion of said body comprising a first shoulder;

said second side of said portion of said body comprising a second shoulder;

said first plurality of external teeth and said first plurality of internal teeth being disposed at a first distance from said first shoulder;

said second plurality of external teeth and said second plurality of internal teeth being disposed at a second distance from said second shoulder;

said second distance being substantially greater than said first distance;

said first distance comprising said means for solely receiving said first stabilizer bar; and said second distance comprising said means for solely receiving said second stabilizer bar.

8. The vehicular suspension system according to claim 7, wherein:

said first shoulder comprises an axial stop for said first end of said first stabilizer bar;

said second shoulder comprising an axial stop for said second stabilizer bar;

said portion of said body further comprising at least one passage opening;

said at least one passage opening extending between said first shoulder and said second shoulder;

said at least one passage opening extending in said axial direction;

said at least one passage comprising means for providing fluid communication between said first hole and said second hole during manufacture of said hydraulic rotary actuator;

said shaft means comprising a plurality of splines extending radially outward;

said cylinder means comprising a plurality of ribs extending radically outward;

said plurality of work chambers being disposed between said plurality of splines and said plurality of ribs;

said hydraulic rotary actuator further comprising a first hydraulic connection and a second hydraulic connection;

said first hydraulic connection comprising for providing hydraulic fluid to one of:
said first chamber and said third chamber; and
said second chamber and said fourth chamber;

means for connecting said first stabilizer bar and said second stabilizer bar to wheel assemblies of a motor vehicle;

means for fastening said automobile suspension system to a motor vehicle;

a hydraulic system for providing hydraulic fluid to operate said hydraulic rotary actuator; and said hydraulic system comprising a hydraulic pump.

9. A vehicular suspension system including a hydraulic rotary actuator, said hydraulic rotary actuator comprising:

a body;

said body of said hydraulic rotary actuator comprising a first member and a second member;

at least one of said first member and said second member being rotatable with respect to the other of said first member and said second member;

said at least one of said first member and said second member being rotatable about an axis of rotation with respect to the other of said first member and said second member by hydraulic fluid under pressure;

a first stabilizer bar;

a second stabilizer bar;

a first hole and a second hole being disposed substantially within said body;

said first hole comprising means for preventing insertion of said first stabilizer bar into said body beyond a first distance;

said second hole comprising means for preventing insertion of said second stabilizer bar into said body beyond a second distance;

each said means for preventing insertion comprising a substantially continuous bottom in its corresponding hole;

each said first hole and said second hole having a first end and a second end;

each said first end comprising an opening; and each said second end comprising said substantially continuous bottom disposed opposite said opening of said corresponding first end.

10. The vehicular suspension system according to claim 9, wherein:

said first hole comprises means for non-rotatably engaging said first stabilizer bar; and said second hole comprises means for non-rotatably engaging said second stabilizer bar.

11. The vehicular suspension system according to claim 10, wherein:

said means for non-rotatably engaging said first stabilizer bar of said first hole comprises means for solely receiving said first stabilizer bar; and said means for non-rotatably engaging said second stabilizer bar of said second hole comprising means for solely receiving said second stabilizer bar.

12. The vehicular suspension system according to claim 11, wherein:

a portion of said body of said hydraulic rotary actuator is disposed between said substantially continuous bottom of said first hole and said substantially continuous bottom of said second hole;

said portion of said body of said hydraulic rotary actuator is comprising a solid, continuous portion of said body of said hydraulic rotary actuator;

said first member of said hydraulic rotary actuator comprises shaft means;

said second member of said hydraulic rotary actuator comprises cylinder means;

said cylinder means and said shaft means being disposed to rotate about said axis of rotation;

said shaft means being disposed concentrically within said cylinder means;

said cylinder means being disposed to rotate concentrically about said shaft means;

a plurality of work chambers being disposed substantially between said cylinder means and said shaft means;

said plurality of work chambers being concentrically spaced apart from one another;

said plurality of work chambers comprising at least a first chamber, a second chamber, a third chamber, and a fourth chamber;

said first chamber and said third chamber being disposed opposite one another;

said second chamber and said fourth chamber being disposed opposite one another; and each of said first chamber and said third chamber being disposed to alternate with each of said second chamber and said fourth chamber.

13. The vehicular suspension system according to claim 12, wherein:

said portion of said body of said hydraulic rotary actuator comprises first means for providing a hydraulic connection between said first chamber and said third chamber;

said portion of said body of said hydraulic rotary actuator comprising second means for providing a hydraulic connection between said second chamber and said fourth chamber;

said first means for providing a hydraulic connection comprising a first transverse opening being disposed in said portion of said body;

said first transverse opening being disposed substantially between said first chamber and said third chamber;

said first transverse opening comprising means for providing hydraulic communication between said first chamber and said third chamber;

said second means for providing a hydraulic connection comprising a second transverse opening being disposed in said portion of said body;

said second transverse opening being disposed substantially between said second chamber and said fourth chamber;

said second transverse opening comprising means for providing hydraulic communication between said second chamber and said fourth chamber;

said portion of said body of hydraulic rotary actuator having an outer circumference;

a substantial portion of said portion of said body comprising a first portion of said portion of said body;

said first portion having a diameter;

said first transverse opening comprising a second portion of said portion of said body;

said second portion having a length;

said second transverse opening comprising a third portion of said portion of said body;

said third portion having a length;

said length of said second portion and said length of said third portion being substantially equal; and said length of each of said second portion and said third portion being less than said diameter of said first portion.

14. The vehicular suspension system according to claim 13, wherein:

said axis of rotation defines a longitudinal axis and an axial direction parallel to said longitudinal axis;

said first stabilizer bar having a first end disposed adjacent said hydraulic rotary actuator;

a first plurality of external teeth disposed concentrically about a portion of said first end of said first stabilizer bar;

said first plurality of external teeth projecting radially outward;

said first plurality of external teeth having a length disposed parallel to said axial direction;

said means for non-rotatably engaging said first stabilizer bar comprising means for engaging said first plurality of external teeth;

said shaft means having a first inner circumferential portion;

said means for engaging said first plurality of external teeth comprising a first plurality of internal teeth disposed within said first inner circumferential portion of said shaft means;

said first plurality of internal teeth projecting radially inward;

said first plurality of internal teeth having a length disposed parallel to said axial direction;

said first plurality of external teeth of said first stabilizer bar being engaged within said first plurality of internal teeth of said first inner circumferential portion of said shaft means;

said second stabilizer bar having a first end disposed adjacent said hydraulic rotary actuator;

a second plurality of external teeth disposed concentrically about a portion of said first end of said second stabilizer bar;

said second plurality of external teeth projecting radially outward;

said second plurality of external teeth having a length disposed parallel to said axial direction;

said means for non-rotatably engaging said second stabilizer bar comprising means for engaging said second plurality of external teeth;

said shaft means having a second inner circumferential portion;

said means for engaging said second plurality of external teeth comprising a second plurality of internal teeth disposed within said second inner circumferential portion of said shaft means;

said second plurality of internal teeth projecting radially inward;

said second plurality of internal teeth having a length disposed parallel to said axial direction; and said second plurality of external teeth of said second stabilizer bar being engaged within said second plurality of internal teeth of said second inner circumferential portion of said shaft means.

15. The vehicular suspension system according to claim 14, wherein:

said hydraulic rotary actuator having a first end and a second end and said longitudinal axis disposed therebetween;

a central portion of said hydraulic rotary actuator being disposed between said first end and said second end;

said portion of said body of said hydraulic rotary actuator being disposed between at least one of:
said first end and said central portion of said hydraulic rotary actuator; and
said second end and said central portion of said hydraulic rotary actuator;

said portion of said body having a first side and a second side;

said first side of said portion of said body comprising a first shoulder;

said second side of said portion of said body comprising a second shoulder;

said first plurality of external teeth and said first plurality of internal teeth being disposed at a first distance from said first shoulder;

said second plurality of external teeth and said second plurality of internal teeth being disposed at a second distance from said second shoulder;

said second distance being substantially greater than said first distance;

said first distance comprising said means for solely receiving said first stabilizer bar;

said second distance comprising said means for solely receiving said second stabilizer bar;

said first shoulder comprises an axial stop for said first end of said first stabilizer bar;

said second shoulder comprising an axial stop for said second stabilizer bar;

said portion of said body further comprising at least one passage opening;

said at least one passage opening extending between said first shoulder and said second shoulder;

said at least one passage opening extending in said axial direction;

said at least one passage comprising means for providing fluid communication between said first hole and said second hole during manufacture of said hydraulic rotary actuator;

said shaft means comprising a plurality of splines extending radially outward;

said cylinder means comprising a plurality of ribs extending radially outward;

said plurality of work chambers being disposed between said plurality of splines and said plurality of ribs;

said hydraulic rotary actuator further comprising a first hydraulic connection and a second hydraulic connection;

said first hydraulic connection comprising for providing hydraulic fluid to one of:
said first chamber and said third chamber; and
said second chamber and said fourth chamber;

means for connecting said first stabilizer bar and said second stabilizer bar to wheel assemblies of a motor vehicle;

means for fastening said automobile suspension system to a motor vehicle;

a hydraulic system for providing hydraulic fluid to operate said hydraulic rotary actuator; and said hydraulic system comprising a hydraulic pump.

16. A vehicular suspension system including a rotary actuator, said rotary actuator comprising:

a body;

said body of said hydraulic rotary actuator comprising a first member and a second member;

at least one of said first member and said second member being rotatable with respect to the other of said first member and said second member;

said at least one of said first member and said second member being rotatable about an axis of rotation with respect to the other of said first member and said second member by hydraulic fluid under pressure;

a first stabilizer bar;

a second stabilizer bar;

a first hole and a second hole being disposed substantially within said body;

said first hole comprising means for preventing insertion of said first stabilizer bar into said body beyond a first distance;

said second hole comprising means for preventing insertion of said second stabilizer bar into said body beyond a second distance;

each said means for preventing insertion comprising a substantially continuous bottom in its corresponding hole;

each said first hole and said second hole having a first end and a second end;

each said first end comprising an opening;

each said second end comprising said substantially continuous bottom disposed opposite said opening of said corresponding first end;

said first hole comprising means for non-rotatably engaging said first stabilizer bar;

said second hole comprising means for non-rotatably engaging said second stabilizer bar;

said means for non-rotatably engaging said first stabilizer bar of said first hole comprising means for solely receiving said first stabilizer bar;

said means for non-rotatably engaging said second stabilizer bar of said second hole comprising means for solely receiving said second stabilizer bar;

a portion of said body of said hydraulic rotary actuator being disposed between said substantially continuous bottom of said first hole and said substantially continuous bottom of said second hole;

said portion of said body of said hydraulic rotary actuator comprising a solid, continuous portion of said body of said hydraulic rotary actuator;

said first member of said hydraulic rotary actuator comprising shaft means;

said second member of said hydraulic rotary actuator comprising cylinder means;

said cylinder means and said shaft means being disposed to rotate about said axis of rotation;

said shaft means being disposed concentrically within said cylinder means;

said cylinder means being disposed to rotate concentrically about said shaft means;

a plurality of work chambers being disposed substantially between said cylinder means and said shaft means;

said plurality of work chambers being concentrically spaced apart from one another;

said plurality of work chambers comprising at least a first chamber, a second chamber, a third chamber, and a fourth chamber;

said first chamber and said third chamber being disposed opposite one another;

said second chamber and said fourth chamber being disposed opposite one another; and each of said first chamber and said third chamber being disposed to alternate with each of said second chamber and said fourth chamber.

17. The vehicular suspension system according to claim 16, wherein:

said portion of said body of said hydraulic rotary actuator comprises first means for providing a hydraulic connection between said first chamber and said third chamber;

said portion of said body of said hydraulic rotary actuator comprising second means for providing a hydraulic connection between said second chamber and said fourth chamber;

said first means for providing a hydraulic connection comprising a first transverse opening being disposed in said portion of said body;

said first transverse opening being disposed substantially between said first chamber and said third chamber;

said first transverse opening comprising means for providing hydraulic communication between said first chamber and said third chamber;

said second means for providing a hydraulic connection comprising a second transverse opening being disposed in said portion of said body;

said second transverse opening being disposed substantially between said second chamber and said fourth chamber;

said second transverse opening comprising means for providing hydraulic communication between said second chamber and said fourth chamber;

said portion of said body of said hydraulic rotary actuator having an outer circumference;

a substantial portion of said portion of said body comprising a first portion of said portion of said body;

said first portion having a diameter;

said first transverse opening comprising a second portion of said portion of said body;

said second portion having a length;

said second transverse opening comprising a third portion of said portion of said body;

said third portion having a length;

said length of said second portion and said length of said third portion being substantially equal;

said length of each of said second portion and said third portion being less than said diameter of said first portion;

said axis of rotation defines a longitudinal axis and an axial direction parallel to said longitudinal axis;

said first stabilizer bar having a first end disposed adjacent said hydraulic rotary actuator;

a first plurality of external teeth disposed concentrically about a portion of said first end of said first stabilizer bar;

said first plurality of external teeth projecting radially outward;

said first plurality of external teeth having a length disposed parallel to said axial direction;

said means for non-rotatably engaging said first stabilizer bar comprising means for engaging said first plurality of external teeth;

said shaft means having a first inner circumferential portion;

said means for engaging said first plurality of external teeth comprising a first plurality of internal teeth disposed within said first inner circumferential portion of said shaft means;

said first plurality of internal teeth projecting radially inward;

said first plurality of internal teeth having a length disposed parallel to said axial direction;

said first plurality of external teeth of said first stabilizer bar being engaged within said first plurality of internal teeth of said first inner circumferential portion of said shaft means;

said second stabilizer bar having a first end disposed adjacent said hydraulic rotary actuator;

a second plurality of external teeth disposed concentrically about a portion of said first end of said second stabilizer bar;

said second plurality of external teeth projecting radially outward;

said second plurality of external teeth having a length disposed parallel to said axial direction;

said means for non-rotatably engaging said second stabilizer bar comprising means for engaging said second plurality of external teeth;

said shaft means having a second inner circumferential portion;

said means for engaging said second plurality of external teeth comprising a second pluraltiy of internal teeth disposed within said second inner circumferential portion of said shaft means;

said second plurality of internal teeth projecting radially inward;

said second plurality of internal teeth having a length disposed parallel to said axial direction;

said second plurality of external teeth of said second stabilizer bar being engaged within said second plurality of internal teeth of said second inner circumferential portion of said shaft means;

said hydraulic rotary actuator having a first end and a second end and said longitudinal axis disposed therebetween;

a central portion of said hydraulic rotary actuator being disposed between said first end and said second end;

said portion of said body of said hydraulic rotary actuator being disposed between at least one of:
said first end and said central portion of said hydraulic rotary actuator; and
said second end and said central portion of said hydraulic rotary actuator;

said portion of said body having a first side and a second side;

said first side of said portion of said body comprising a first shoulder;

said second side of said portion of said body comprising a second shoulder;

said first plurality of external teeth and said first plurality of internal teeth being disposed at a first distance from said first shoulder;

said second plurality of external teeth and said second plurality of internal teeth being disposed at a second distance from said second shoulder;

said second distance being substantially greater than said first distance;

said first distance comprising said means for solely receiving said first stabilizer bar;

said second distance comprising said means for soleley receiving said second stabilizer bar;

said first shoulder comprises an axial stop for said first end of said first stabilizer bar;

said second shoulder comprising an axial stop for said second stabilizer bar;

said portion of said body further comprising at least one passage opening;

said at least one passage opening extending between said first shoulder and said second shoulder;

said at least one passage opening extending in said axial direction;

said at least one passage comprising means for providing fluid communication between said first hole and said second hole during manufacture of said hydraulic rotary actuator;

said shaft means comprising a plurality of splines extending radially outward;

said cylinder means comprising a plurality of ribs extending radially outward;

said plurality of work chambers being disposed between said plurality of splines and said plurality of ribs;

said hydraulic rotary actuator further comprising a first hydraulic connection and a second hydraulic connection;

said first hydraulic connection comprising for providing hydraulic fluid to one of:
said first chamber and said third chamber; and
said second chamber and said fourth chamber;

means for connecting said first stabilizer bar and said second stabilizer bar to wheel assemblies of a motor vehicle;

means for fastening said automobile suspension system to a motor vehicle;

a hydraulic system for providing hydraulic fluid to operate said hydraulic rotary actuator; and said hydraulic system comprising a hydraulic pump.

* * * * *

UNITED STATES PATENT AND TRADEMARK OFFICE
CERTIFICATE OF CORRECTION

PATENT NO. : 5,700,027  Page 1 of 2

DATED : December 23, 1997

INVENTOR(S) : Stefan SCHIFFLER

It is certified that error appears in the above-identified patent and that said Letters Patent is hereby corrected as shown below:

In column 2, line 42, after 'be' delete "their respective closest end surfaces."

In column 2, line 43, before 'that,' delete "The effect achieved can be".

In column 2, line 58, after 'the', delete "work" and insert --word--.

In column 3, line 6, after 'rotary', delete "actuatory" and insert --actuator--.

In column 3, line 34, after 'second', delete "hold" and insert --hole--.

UNITED STATES PATENT AND TRADEMARK OFFICE
CERTIFICATE OF CORRECTION

PATENT NO. : 5,700,027
DATED : December 23, 1997
INVENTOR(S) : Stefan SCHIFFLER

It is certified that error appears in the above-identified patent and that said Letters Patent is hereby corrected as shown below:

In column 5, line 21, after 'chambers', delete "37a." and insert --37b.--.

In column 8, line 13, after 'stabilizer', delete "1a40," and insert --1a',--.

In column 8, line 57, after 'arranged', delete "sot hat" and insert --so that--.

In column 13, line 21, Claim 6, after the second occurrence of 'said', delete "seconds" and insert --second--.

Signed and Sealed this

Twenty-first Day of April, 1998

*Attest:*

BRUCE LEHMAN

*Attesting Officer*       *Commissioner of Patents and Trademarks*